(12) United States Patent
Beckerman

(10) Patent No.: US 6,906,307 B2
(45) Date of Patent: Jun. 14, 2005

(54) FAIL SAFE ONE WIRE INTERFACE FOR OPTICAL EMITTER-DETECTOR PHOTO-EYE SYSTEMS WITH DIAGNOSTICS

(75) Inventor: Howard Beckerman, Shrewsbury, NJ (US)

(73) Assignee: Mechanical Ingenuity Corp, Shrewsbury, NJ (US)

( * ) Notice: Subject to any disclaimer, the term of this patent is extended or adjusted under 35 U.S.C. 154(b) by 296 days.

(21) Appl. No.: 10/376,015

(22) Filed: Mar. 3, 2003

(65) Prior Publication Data
US 2004/0173728 A1 Sep. 9, 2004

(51) Int. Cl.[7] ............................................. H01J 40/14
(52) U.S. Cl. .................... 250/221; 250/559.12
(58) Field of Search ........................... 250/221, 222.1, 250/216, 551, 559.12, 559.4; 315/154, 158; 340/507, 555, 556, 557

(56) References Cited

U.S. PATENT DOCUMENTS

| | | | |
|---|---|---|---|
| 4,390,812 A | * | 6/1983 | Seidler .................... 315/200 A |
| 4,922,168 A | | 5/1990 | Waggamon |
| 5,079,417 A | | 1/1992 | Strand |
| 5,191,268 A | | 3/1993 | Duhame |
| 5,233,185 A | | 8/1993 | Whitaker |
| 5,285,136 A | | 2/1994 | Duhame |
| 5,357,183 A | | 10/1994 | Lin |
| 5,465,033 A | | 11/1995 | Fassih-Nia |
| 5,633,778 A | | 5/1997 | Chang |

* cited by examiner

Primary Examiner—Que T. Le

(57) ABSTRACT

A one wire interface for optical emitter-detectors is disclosed that is fail-safe, simple, and includes diagnostics, noise and static protection. Two indicator lamps are used for diagnostics indicating four conditions; a) Ready, b) Not Connected, c) Blocked Beam, d) No power. This allows single or two conductor systems to have the same troubleshooting information as the 4-wire systems.

3 Claims, 2 Drawing Sheets

FAIL SAFE ONE WIRE INTERFACE FOR OPTICAL EMITTER-DETECTOR PHOTO-EYE SYSTEMS WITH DIAGNOSTICS

BACKGROUND OF THE INVENTION

Optical emitter-detector pairs (photo-eye) are used for sensing obstructions on motorized door operators. The emitter half creates a beam of light that is pointed across the door opening. This beam is received by the optical detector along with all the other sources of ambient light in the room. Ambient light is cancelled out largely by switching the emitter at a frequency much higher than ambient sources, say 30-khz, and using a frequency filter in the detector.

Such emitter-receivers are well known and available complete with all associated frequency driver and frequency discrimination circuitry. They are commonly used in garage door operators for obstruction detection and as remote controls on televisions.

In the instant application if an obstacle is in the door opening it is expected that it will block the light beam received by the detector thereby ultimately closing a switch contact. With the contact closed the motor operator will either not-close if it is already open or stop closing and re-open.

One mechanical mounting option has the emitter mounted on the floor to one side of a door or gate opening, and the detector mounted on the floor on the opposite side of the opening. The photo-eye is thereby fixed or non-moving but protects the opening. Wires connect emitter to detector to motor operator and run around the opening to avoid the moving door or gate. Typically 100-feet of wire is required for connection of the system.

Another mechanical option has the emitter and detector fastened on opposite sides of the moving edge of the door or gate, traveling with it. Flexible wire, coil cord, or a rotary wire reel connects the moving photo-eye to a fixed motor operator. The most common form being the 2-conductor wire reel. In the spring loaded wire reel electrical contact is made from its rotating reel to its stationary body by means of conductive brushes and rings. Such brushes create electrical noise while rotating when they are new, and as they age or if they become dirty the noise takes the form of momentary electrical disconnection from the brush to the ring.

All photo-eye systems require power to operate and in return provide a signal in the form of a voltage, voltage pulses, or a contact closure. Therefore you might conclude that two wires would be required for supplying power and one or two more wires would be used for the signal. In actual practice two-conductor, unshielded, non-twisted wire is preferred by installers primarily because they only have two-conductor wire and two-conductor wire reels are more common than others. Whereupon the manufacturers of photo-eyes designed their units such that power and signal can be sent over the same two wires.

Photo-eye alignment signals are superimposed or modulated into its two power wires. The motor operator will not work if the signal from the photo-eye is missing and will end up in the fully open position, unable to close. This becomes a security issue in that the door or gate cannot close unless the safety system is bypassed. Troubleshooting such a system problem without the benefit of an oscilloscope is difficult because the alignment signal is mixed with the power. Some industrial high security operators use 4-wire photo-eyes to avoid the troubleshooting difficulties involved with two wire systems.

Residential garage door operators use a microprocessor to receive the pulses from the photo-eye and software to detect their loss. If such pulses are missing the motor operator will not close if it is already open or stop and re-open if it is closing. Therefore if the photo-eye system has a broken wire, a shorted wire, a defective component, is misaligned, has no power or if the beam is blocked the effect is the same, the door will not close. Troubleshooting is difficult, and failures common, such that a bypass has been devised. Holding down the pushbutton for more than 2-seconds will close the door even if the photo-eye beam is blocked. The button must be held down continuously until the door is fully closed or it will stop.

Industrial door and gate operators do not come with a photo-eye. Conditions of dirt or mud, process dust or muck, snow or ice may make an optical system impractical because their lenses need continuous cleaning. To this end industrial motorized operators come with just an electrical terminal for the attachment of any number of different safety systems. A simple contact closure at this terminal will stop the motor operator from closing if it is open and will reopen it if closing. This invention primarily addresses this type of motor operator when conditions favor to the use of a photo-eye safety system.

The industrial operators predominantly tend to use electromechanical relay logic instead of microprocessor or electronic logic. The reason is reliability related to environmental issues, and electrical noise. Environmentally an industrial motor operator will be hot, wet and dirty. Each time the industrial motor stops every electrical conductor and trace inside the electrical enclosure will be at ground zero to a huge radiated and conducted electromagnetic pulse. This is caused by the residual magnetic field energy left in the motors windings collapsing whenever the motor contactor opens. The motor is located outside of the electrical enclosure but its high voltage arc is formed across contacts located inside the enclosure as they open the motors magnetic field.

Industrial doors and gates are heavy. They are built with thick steel to stop a vehicle from pushing through them and a typical example might be 3,000-lbs and an unusual example might be 30,000-lbs, moving this heavy load by hand is kind of, tough. They protect areas that absolutely require security. It is therefore more important that these motor operators work than say your garage door at home. If a photo-eye system is used it must be able to be repaired easily and bypassed temporarily when necessary.

DESCRIPTION OF PRIOR ART

FIG. 2 describes a generic and commonly used optical emitter detector pairs available from numerous suppliers. The emitter (2) creates a beam of modulated light (3), and the detector (1) decodes the modulated light.

A light emitting diode and frequency driving circuitry is all packaged into one device (34). It gets its power from capacitor (36) through diode (35) the reasons for this will become apparent. Power is applied to (39) and (40).

A light detecting device, amplifier, and frequency discriminating components are all packaged into one device (33). Once it detects the correct modulation frequency it begins to pulse the base of a transistor (30). This acts like a switch briefly shorting out the input power terminals (37) (38). Diode (31) charges capacitor (32) and allows (38) to be shorted to (37) briefly while maintaining a charge on the capacitor (38). The light detector (33) gets its power from capacitor (32) thereby it does not loose power during the brief outages described.

These optical emitter-detector pairs are connected to each other as depicted in FIG. 1, the emitter (2) sends a modulated light beam (3), to the detector (1). They are connected in parallel using 2-conductors to this invention on pins (4) and (5). These 2-wires carry both the power to run the optical emitter-detector and an electrical signal indicative that the desired light beam is present or absent.

This dual electrical signal is depicted in FIG. 3. The voltage on (4) is plotted on the y-axis with (5) as the ground-reference, and time is the x-axis. The first 4-milliseconds depict no light beam and thereby no shorting pulses and from 4-milliseconds on depicts the presence of light with shorting pulses.

It should be understood that such 2-conductor optical emitter-detectors and their operation as described are not part of this invention, that they represent prior art. Manufacturers of the photo-eye systems generally recommend a voltage regulated power supply be provided and that a dropping resistor be used to power the units and allow the electrical shorting pulses to occur. The shorting pulses are then coupled into a microprocessor or some other means left to the user's imagination.

BRIEF SUMMARY OF THE INVENTION

A voltage controlled current source (VCCS) supplies constant current, variable voltage, to power the photo-eye. Constant current removes susceptibility to electromagnetic noise seeking to demodulate onto the signal wire and removes ground loop signals present in the metal door components.

An electrostatic filter removes static discharges conducted through direct contact and all polarized direct contact noise signals. One of the 2-terminals can be referenced to ground leaving only a single signal/power wire. Since the door, gate, frame, or track is commonly made of metal they can act as the ground conductor eliminating one of the wires.

This invention uses two indicator lamps for diagnostics; they indicate four conditions; a) Ready, b) Not Connected, c) Blocked Beam, d) No power. This allows single or two conductor systems to have the same troubleshooting information as the 4-wire systems. The detail of the diagnostics are as follows;

If just the green lamp illuminates, the system is good. Indicating the optical emitter and detector are connected, working properly, power is present, and the beam is aligned. The motor operator is able to close the door or gate.

If just the red lamp illuminates, the system is broken. The optical emitter detector is not connected or its wire is not making connection. Power is applied but one or both optical components are not working or not connected. The motor operator will not close the gate or door.

If both the red and the green lamps illuminate, the beam is merely blocked or misaligned. This also means the wire is connected, power is applied, and the emitter detectors are working properly. The motor operator will not close the gate or door.

If neither lamp illuminates there is no power coming from the operator.

The preferred embodiment accomplishes all of this without using any integrated circuits, software or microprocessors. The lack of integrated circuits allows proper functioning with any unregulated voltage from 5 to 50 volts. It allows operation under water and being covered with dirt or mud and does not require coatings or environmental sealing or enclosures.

DETAILED DESCRIPTION OF THE INVENTION

Figure 4:
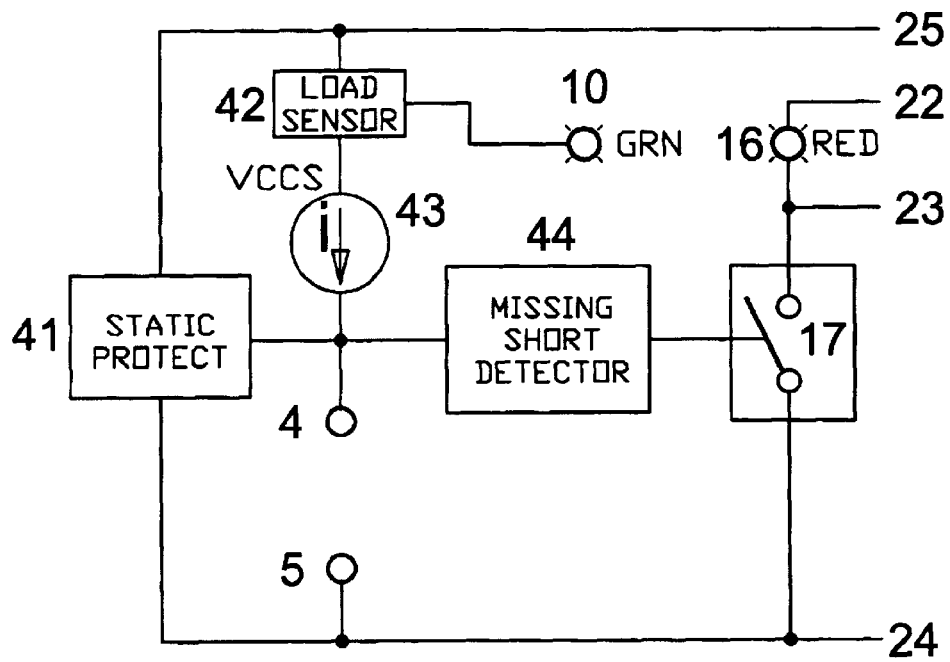
FIG. 4 is a block diagram of the invention.

FIG. 4 is a block diagram of the invention. Electrical power (DC) is applied to (25) and referenced to common (24). A voltage controlled current source (43) (VCCS) supplies constant current from (25) to (4). This current is typically fixed at some value, say 22-ma, and will allow the voltage on (4) to vary. As the voltage on (4) varies from common (24) to the supply voltage (25) the current remains fixed at the preset value. The VCCS (43) powering the photo-eye will successfully operate photo-eyes of any voltage, and allow either intermittent or indefinite short circuits while drawing the same constant current.

Constant current is naturally noise immune. Radiated electromagnetic interference (EMI) takes the form of a rapidly changing voltage, measured in volts per meter. Since 20-volts per meter will cook a human, radiated EMI is commonly less than this. It is the changing voltage of EMI that induces a current in fixed conductors located in its field, similar to the same effect noted in a transformer. If a current is induced into the 100-feet or so of photo-eye wire, it will create a voltage limited only by the wires impedance to ground. The current will be generating a voltage in the wire to stop the decay of the magnetic field created by the current in the wire.

The effect of current induced EMI into a constant current variable voltage source is the ratio between the currents. If 2-ma of EMI is induced into a wire driven by a 20-ma current source, 0.1-volt of EMI is produced (2-ma/20-ma). If the same 2-ma of EMI is induced into a wire with a pull up resistor, such as in prior art, ohms law has the voltage equal to the resistance times the current. A 1,000 ohm resistor with 2-ma of EMI produces 2-volts of noise signal (2-ma×1,000-ohms). Enough noise to mess up 5-volt logic.

This is why current sources are inherently less susceptible to noise than resistance sources; the induced noise current is multiplied by the resistance of the resistance source but divided by the current of the current source. Prior art uses a resistor as a source from a regulated voltage supply and then must reduce EMI by inserting a capacitor across the photo-eye wires. The capacitor must be large to reduce EMI significantly but the photo-eyes fast shorting signal is also reduced and a strain is placed on the shorting transistor (30).

In FIG. 4, Terminal (5) could optionally be connected to ground leaving only 1-signal/power wire (4). With (5) connected to ground its close to zero as you can get preventing it from demodulating any electrical noise. If the metal frame of the door or gate is used this is one line you know cannot be broken.

Figure 3:
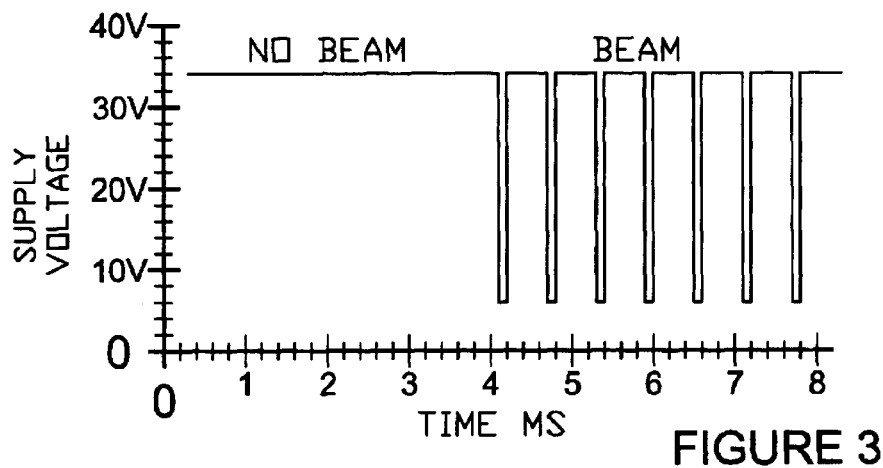
FIG. 3 depicts the electrical signals superimposed on the power for either a completed light beam or broken light beam.

The photo-eye system (1) (2) will produce shorting pulses as shown in FIG. 3 to terminal (4) that is connected to a missing short detector (44). After a predetermined number of shorting pulses are missing the switch (17) will close. This causes the terminal (23) to be connected to (24) signaling a motorized operator that there is an obstruction. If a jumper wire were to be connected from (4) to (5), this would make a continuous short and the missing short detector (44) would not close switch (17). Thus providing a method of bypassing the system but one that requires determined effort because a critical safety feature has been disabled.

The switch (17) closure also illuminates the red lamp (16) indicating the lack of shorting pulses or signal from the photo-eye. The red lamp (16) derives its power from terminal (22) that can be connected to any convenient voltage used by the motor operator or it could be connected to terminal (25) if such voltage is the same as that used by the motor operator.

A current measuring means (42) detects if the full current from the VCCS (43) is present. If the VCCS (43) has full current then the green lamp (10) illuminates. Anything less than full current will not illuminate the green lamp (10). Most photo-eye emitters use a light emitting diode as the source for the light. Such devices light output is dependant entirely on current, normally a maximum of 20-ma. The photo-eye detector only receives the light and uses less energy, normally 1-ma if no signal is present and 3-ma with a signal present. The current drawn by the photo-eye system should then be 21-ma if both are connected. If the emitter (2) or the detector (1) were not both connected then the current sensor (42) would be adjusted such that the green lamp (10) would not illuminate.

Figure 1:
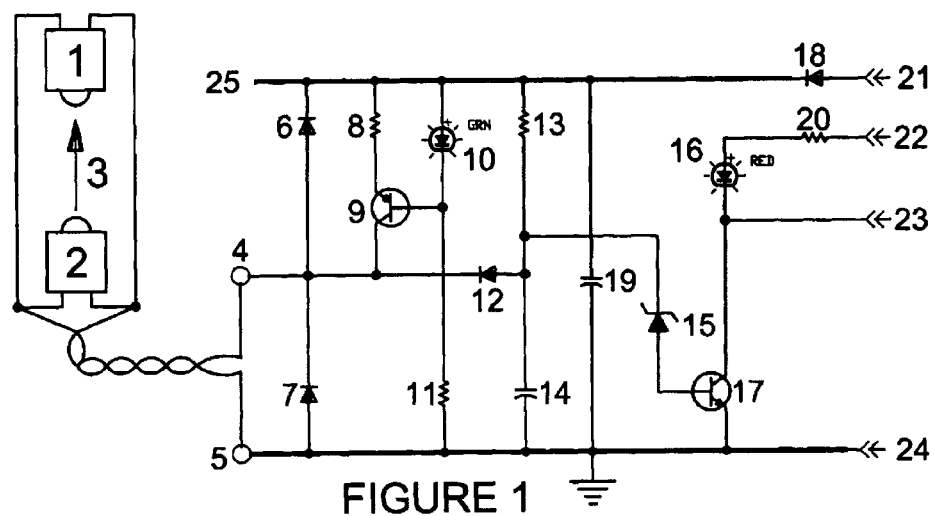
FIG. 1 is a schematic diagram of the preferred embodiment.
Figure 2:
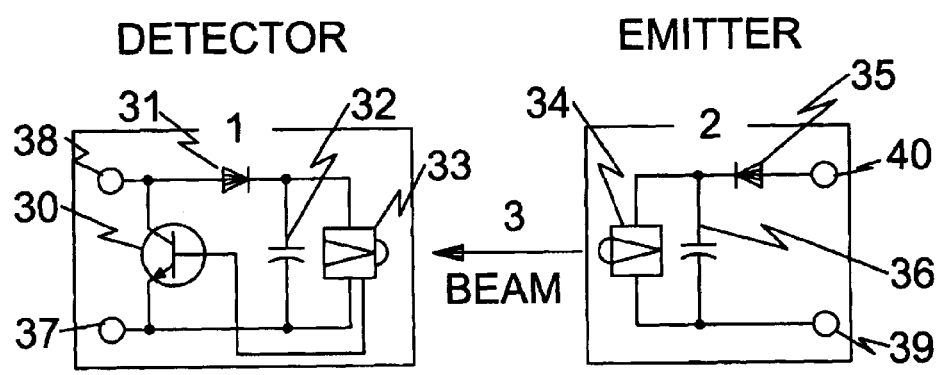
FIG. 2 is reference drawing of a typical 2-wire optical emitter-detector.

The circuitry of FIG. 1 is a detailed schematic of the preferred embodiment. Terminal (24) connects to a grounded or common point inside a motor operator; terminal (5) connects to a grounded or common point convenient to the photo-eye (1) (2). Terminal (21) is connected to a source of power such as a 24-volt AC transformer but it can be any voltage from 5-volts through 50-volts. The voltage is rectified by diode (18) and filtered by capacitor (19) to form the unregulated supply voltage (25). Items (18) and (19) are not required if the motor operator has a source of DC power, in this eventuality (21) and (25) are simply connected together.

Terminal (4) is the 1-wire signal and power pin and it is protected from static electricity by diodes (6 & 7). If a high voltage arc were to jump to terminal (4) then diode (6) would conduct if it tried to exceed the supply voltage (25) and diode (7) would conduct if it tried to go below the common point (5). Normal shorting signals from the photo-eye connected to terminal (4), that falls between the rails of common (5) and the supply (25) would not be burdened by the static protection network as it remains an open circuit.

The voltage controlled current source (43) is formed using 4-components (8, 9, 10, & 11). The light emitting diode (10) is driven by resistor (11) to a voltage below the supply rail (25), say 1.8-volt. This voltage dropped across the LED (10) is constant and independent of the supply voltage. This constant voltage from the LED (10) connects to the base of PNP transistor (9). The emitter of PNP transistor (9) will thereby be 0.7-volts higher or 1.1-volts below the supply rail (25). The current in the emitter will be determined by the value of resistor (8). With 1.1 volts across it, using ohms law, resistor (8) with a value of 51-ohms will produce 22-ma in the emitter. Resistor (8) value sets the amount of constant current supplied. The current in the collector of the transistor (9) will be close to the same current as its emitter and thus forms a current source.

It can be seen that if the collector of (9) is shorted to ground (5) or even below ground that the current it provides will not vary. If the supply voltage (25) has ripple or big voltage variations the current will remain constant on terminal (4). As either the supply voltage varies or the load voltage varies the current will remain the same. This will remain true as long as the connected load, the photo-eye, can draw the current being thus supplied. If the photo-eye, its emitter or its detector were to be disconnected the current could not be maintained.

The same 4-components (8, 9, 10, & 11) form the load sensor (42). This is set by the ratio between resistor (8) and resistor (11). As stated earlier, the value of resistor (8) sets the constant current coming from the collector of the transistor (9) then the value of resistor (11) can be varied to set the percentage of current at which the LED (10) turns on. The reasoning behind this is as follows;

It can be seen that if terminal (4) is not connected to anything, the collector of transistor (9) is open and no current is being used by the collector-emitter junction. The transistor (9) has become just a diode with a roughly constant 0.7-volt drop from base to emitter. Since the LED (10) requires 1.8-volt to be lit an additional 1.1-volts is required to be dropped across resistor (8) before it can be lit. Until the LED (10) is lit it is basically an open circuit and does not voltage regulate. The voltage across resistor (8) is then entirely dependant on the current drawn from resistor (11).

If resistor (11) is a high resistance, say 10,000-ohms, and resistor (8), is 51-ohms as stated earlier, and with a 34-volt supply voltage (25), ohms law has 3.3-ma being drawn through resistor (8) and dropping 0.17-volts across it. This voltage plus the 0.7-volts from the emitter-base junction of (9) is not enough to turn on the LED (10) but it has reduced the current required to turn it on.

In another example if resistor (11) is 3,400-ohms, and the supply voltage is 34-volts then 10-ma will be drawn though resistors (11 & 8) and the base-emitter (9) junction. This 10-ma will cause 0.51-volts to be dropped across resistor (8) and 0.7-volts dropped across transistor (9) for a total of 1.21-volts; not enough to turn on the LED but the current required to turn it on has been reduced further. In this manner resistor (11) may be chosen to pick the percentage of current required to turn on the green LED (10).

The missing short detector function (44) is performed by 4-components, (12, 13, 14, & 15). When the photo-eye detector (1) is receiving a valid light beam (3) it is periodically shorting itself out with a switch (30). This conducts through diode (12) to discharge capacitor (14) to ground. Once the beam (3) is blocked the shorting pulses stop and capacitor (14) begins to charge through resistor (13). After some time, say 0.1-sec, 33-shorting pulses have not occurred and the capacitor (14) conducts its voltage to Zener diode (15) and the base of the NPN transistor (17), eventually turning them both on.

The transistor (17) acts as a switch from terminal (23) to (24). These terminals connect to a motor operator and signal that it should not close. In addition the red LED (16) is lit through resistor (20) and power supplied by terminal (22). Terminal (22) can be connected to any DC voltage lower than, equal to, or greater than power supply (25) within the transistors rating. For example if the motor operator ran from a 12-volt supply, terminal (22) could connect to it. This would insure that the higher voltages of the power supply (25) through terminal (23) would not affect the motor operator's lower voltage logic.

The action of the three diodes (6, 7, & 12) and capacitor (14) combine to eliminate electrical noise. It can be seen that if terminal (4) lost connection briefly with the photo-eye system that diode (12) would prevent this eventuality from speeding up the charge rate of the capacitor (14). Such a situation occurs when the brush inside a wire reel fails to make good contact while rotating over dirt. With the loss of connection, terminal (4) is forced to the supply (25) rail by the current source. Also if a brief positive going surge, spike or voltage were to be connected to terminal (4) the effect would be the same.

If a negative going surge, spike or voltage were to be connected to terminal (4) this would be clamped by diode (7) at 0.7-volts below ground, and raised 0.7-volts by diode (12) equally, preventing capacitor (14) from being reversed and damaged. Since ground shorts do nothing but reset the timing and capacitor (14) this negative going noise does not affect its operation.

An improved method for a photo-eye interface has been disclosed herein. While illustrative embodiments of the invention have been described, it is understood that various modifications to the disclosed will be apparent to those skilled in the art. It is intended that this invention be limited only by its claims.

What is claimed is:

1. A photo-eye system having an electrical interface for motorized door, gate or window operators comprising:

A means of converting electrical power into a predetermined regulated electrical current source that allows the voltage to the photo-eye to vary, but maintains the current to the photo-eye at a constant value;

Means to provide a signal output if photo-eye terminals are not periodically shorted;

Switch means responsive to said signal output.

2. A system according to claim 1 further including diagnostics comprising;

Current sensing means to provide an indication to personnel that the current is within set limits;

A means to provide an indication to personnel of the state of the switch means.

3. A system according to claim 1 further including protection from static electricity comprising;

Two diodes connected to prevent a photo-eye signal lead from exceeding the power supply rail voltage value.

* * * * *